United States Patent
Carter et al.

(10) Patent No.: US 8,310,504 B2
(45) Date of Patent: Nov. 13, 2012

(54) SYSTEM AND METHOD FOR PANNING AND SELECTING ON LARGE DISPLAYS USING MOBILE DEVICES WITHOUT CLIENT SOFTWARE

(75) Inventors: Scott Carter, Los Altos, CA (US); John Adcock, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 496 days.

(21) Appl. No.: 12/584,157

(22) Filed: Aug. 31, 2009

(65) Prior Publication Data
US 2011/0050720 A1 Mar. 3, 2011

(51) Int. Cl.
*G09G 5/00* (2006.01)
*G06F 3/033* (2006.01)

(52) U.S. Cl. .................. 345/619; 345/156; 345/158

(58) Field of Classification Search .................. 345/156, 345/158, 660, 619, 672, 684; 715/863, 866
See application file for complete search history.

(56) References Cited

U.S. PATENT DOCUMENTS
6,967,644 B1 * 11/2005 Kobayashi ............... 345/158
2003/0122780 A1 * 7/2003 Hendriks et al. ......... 345/156

OTHER PUBLICATIONS

Ballagas, Rafael et al., "The Smart Phone: A Ubiquitous Input device", p. 70-77, Jan. 2006.*
R. Ballagas, et al., "The smart phone: a ubiquitous input device", IEEE Pervasive Computing, pp. 70-77, 2006.
A. Bilgen, et al., "Using Cellphones to Interact with Public Displays from a Distance", Pervasive Computing, 2007.
J.F. Lapointe, et al., "On-Screen Laser Spot Detection for Large Display Interaction", Proceedings of the IEEE International Workshop on Haptic Audio Environments and their Applications (HAVE 2005), Ottawa, Ontario, Canada, pp. 72-76, Oct. 1-2, 2005.
K. Miyaoku, et al., "C-blink: a hue-difference-based light signal marker for large screen interaction via any mobile terminal", UIST '04, pp. 147-156, Oct. 24-27, 2004.
J. Muller, et al., "Experiences of Supporting Local and Remote Mobile Phone Interaction in Situated Public Display Deployments", International Journal of Mobile Human-Computer Interaction, vol. 1, Issue 2, pp. 1-21, 2009.
B. Myers, et al., "Interacting at a Distance: Measuring the Performance of Laser Pointers and Other Devices", CHI '02, pp. 33-40, Apr. 20-25, 2002.
T. Paek, et al., "Toward universal mobile interaction for shared displays", CSCW '04, pp. 266-269, Nov. 6-10, 2004.

* cited by examiner

*Primary Examiner* — Chante Harrison
(74) *Attorney, Agent, or Firm* — Sughrue Mion, PLLC (57) ABSTRACT

System and method that utilizes light sources, for example projectors embedded in mobile camera phones, to allow users to interact with documents on large displays without requiring users to install any third-party software. With this approach, multiple users can select interactors on the large display by displaying different images via their projector.

29 Claims, 5 Drawing Sheets
(2 of 5 Drawing Sheet(s) Filed in Color)

SYSTEM AND METHOD FOR PANNING AND SELECTING ON LARGE DISPLAYS USING MOBILE DEVICES WITHOUT CLIENT SOFTWARE

DESCRIPTION OF THE INVENTION

1. Field of the Invention

This invention relates in general to methods and systems for enabling interactions with public displays and, more particularly, to enabling panning and selecting of content on large displays using mobile devices without the need to install specialized client software.

2. Description of the Related Art

While there exist many systems that allow people to use their mobile devices to interact with public displays, most of those approaches involve the need to install specialized software, which, as many studies show, in practice, leads to low technology adoption rates. A common refrain among researchers conducting field experiments with such systems is that it is "very difficult to convince users that the application would provide enough value such that users would install it on their phone," as has been reported, for example, in Muller, J., et al., Experiences of Supporting Local and Remote Mobile Phone Interaction in Situated Public Display. Even if the users choose to install the software, the operation of the software may be dependent on an unreliable network connection, which would lead to poor performance.

There are many projects that allow mobile devices to interact with public displays that require special software to be installed on the mobile device, see, for example, Ballagas, R., et al. The smart phone: a ubiquitous input device. IEEE Pervasive Computing '06. pp. 70-77. For example, C-Blink allows multiple users to position a cursor on a large display using an application preinstalled on a mobile device, as described in Miyaoku, K., et al. C-blink: a hue-difference-based light signal marker for large screen interaction via any mobile terminal. UIST '04. pp. 147-156. In C-Blink the installed software generates a time-varying display on the mobile device screen which is then detected by a camera system.

The two non-software approaches for real-time interaction with public displays utilize infra-red (IR) sensors and touchtone dialing during phone calls. There are multiple problems with the IR approach: (1) In general, phones only activate the IR port when attempting to send a file, but doing so eventually times out, requiring the user to continuously keep sending faux files; (2) There is no visible feedback that the user is sending data (though video could be shown on the public display); (3) The approach does not support multiple users; (4) There is no support for interaction other than panning without using gestures or dwell, and dwell using pointers has been shown to perform poorly, see Myers, B., et al. Interacting at a Distance: Measuring the Performance of Laser Pointers and Other Devices. CHI'02. pp. 33-40. For this reason, most IR approaches utilize software on the phone, see Bilgen, A. and Izadi, S. Using Cellphones to Interact with Public Displays from a Distance. Pervasive Computing '07.

In the touchtone approach, users dial a number on the public display and, once connected, use the phone's touchpad to send events (mentioned briefly in Paek, T., et al. Toward universal mobile interaction for shared displays. CSCW '04. pp. 266-269). The fundamental issue with this approach is that it requires a cellular connection that may be unavailable either because the device does not support it or because the device is out-of-range (in a subway, for example).

Another related area of research is the use of laser pointers as remote input devices. Cameras can be used to track the position of the dot of a laser pointer on a screen and convert this information into cursor interaction events, as described in Lapointe, J. F. and Godin, G. On-Screen Laser Spot Detection for Large Display Interaction. Proceedings of the IEEE International Workshop on Haptic Audio Environments and their Applications (HAVE'2005). Ottawa, Ontario, Canada. Oct. 1-2, 2005. pp. 72-76. However, because the camera senses the dot of a laser pointer on a screen, the poor pointing stability in such systems is a problem due to hand movements that are amplified by the distance between the user and the display.

Therefore, there is a need for systems and methods that enable a user to pan and select content on large displays using mobile devices without the need to install the client software and without the need for a network collection.

SUMMARY OF THE INVENTION

The inventive methodology is directed to methods and systems that substantially obviate one or more of the above and other problems associated with conventional techniques for enabling interactions with public displays using a mobile device.

In accordance with one aspect of the inventive technique, there is provided a system including a public display configured to simultaneously display information to multiple users; a camera configured to directly sense light produced by at least one handheld light source held in front of the public display by at least one of the multiple users and to generate image indicative of the sensed light; and a processing module operatively coupled to the public display and the camera and configured to receive the image indicative of the sensed light from the camera and control the information displayed on the public display based on the received image. In the inventive system, the processing module is further configured to cause the public display to display a scalable path and to instruct at least one of the plurality of users to move the at least one handheld light source in a trajectory as the displayed scalable path and to identify at least one of the multiple users who is ready to interact with the public display based on a comparison between the trajectory of the light sensed by the camera and the displayed scalable path. The processing module is further configured to establish an interaction session with the identified at least one of the multiple users.

In accordance with another aspect of the inventive technique, there is provided a system including a public display configured to simultaneously display information to a multiple users; a camera configured to directly sense light produced by at least one handheld light source held in front of the public display by at least one of the multiple users and to generate image indicative of the sensed light; and a processing module operatively coupled to the public display and the camera and configured to receive the image indicative of the sensed light from the camera and control the information displayed on the public display based on the received image. In the inventive system, the processing module is further configured to cause the public display to display to the multiple users multiple predetermined colors such that the light produced by at least one handheld light source must be of one of the plurality of the displayed colors in order to interact with the public display.

In accordance with yet another aspect of the inventive technique, there is provided a method and a computer readable medium embodying a set of instructions, which, when executed by one or more processors cause the one or more processors to perform the method involving using a public display to simultaneously display information to multiple users; directly sensing, using a camera, light produced by at least one handheld light source held in front of the public display by at least one of the multiple users and generating image indicative of the sensed light; controlling, using a processor module, the information displayed on the public display based on the received image; displaying on the public display a scalable path and instructing the multiple users to move the at least one handheld projector in a trajectory as the displayed scalable path; identifying at least one of the multiple users who is ready to interact with the public display based on a comparison between the trajectory of the light sensed by the camera and the displayed scalable path; and establishing an interaction session with the identified at least one of the multiple users.

In accordance with a further aspect of the inventive technique, there is provided a method and a computer readable medium embodying a set of instructions, which, when executed by one or more processors cause the one or more processors to perform the method involving using a public display to simultaneously display information to multiple users; directly sensing, using a camera, light produced by at least one handheld light source held in front of the public display by at least one of the multiple users and generating image indicative of the sensed light; controlling, using a processor module, the information displayed on the public display based on the received image; and displaying to the multiple users a plurality of predetermined colors such that the light produced by at least one handheld light source must be of one of the plurality of the displayed colors in order to interact with the public display.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

One embodiment of the inventive system enables the user to interact with the large public display using a mobile device without the need to install any specialized client software. Specifically, the embodiment of the inventive system enables the user to select content and perform panning using a mobile device, such as a cell phone or a PDA. An embodiment of the invention senses the light emitted by a projector attached to the mobile device and performs the above functions based on the sensed light.

Figure 1:
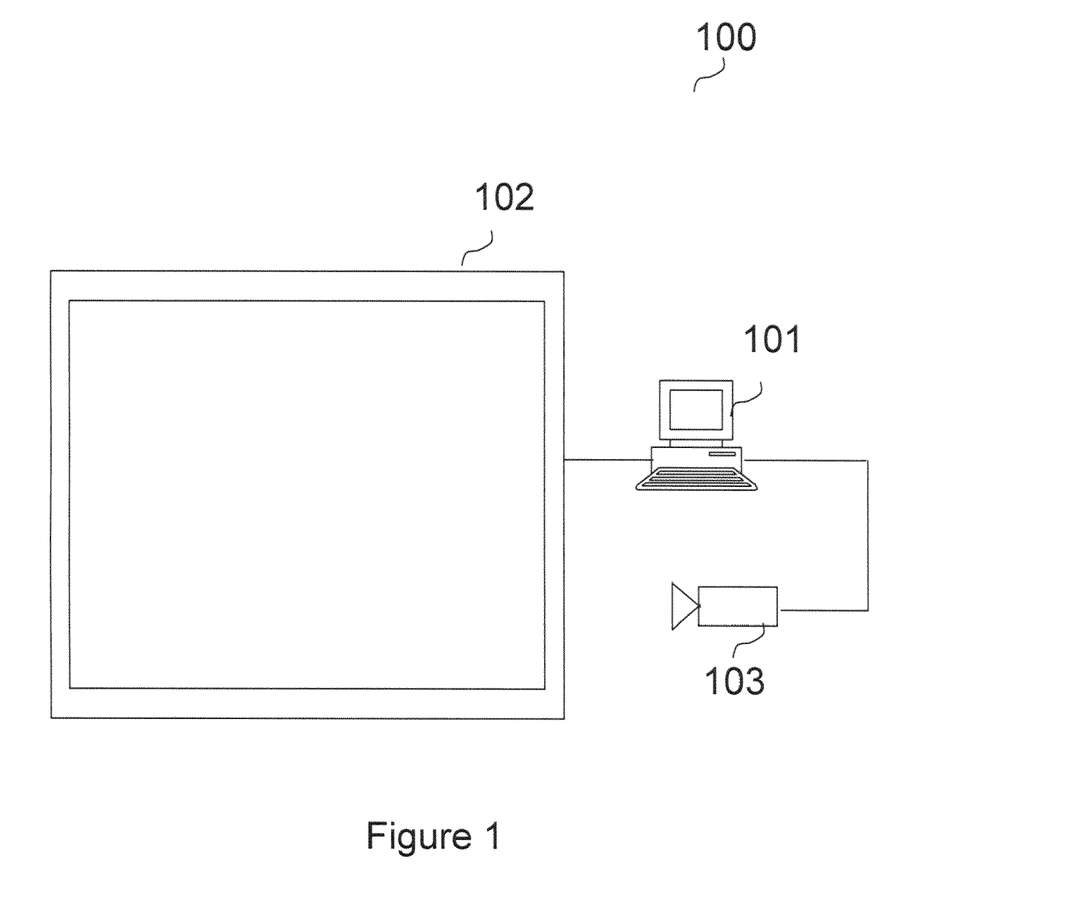
FIG. 1 illustrates an exemplary embodiment of a system according to the inventive concept.

With reference to FIG. 1, an embodiment of the inventive system 100 incorporates only a computer 101 connected to a large display 102 as well as a camera 103 mounted on or near the display 102. In one embodiment, the inventive system uses the camera 103 to track the location and color of the light spot produced by the projector (not shown) associated with the user's mobile device to determine the gestures performed by the user using the mobile device and/or user-initiated changes in color of the light emitted by the projector, and uses the determined gestures and color changes to select content and perform the panning operation on the public display. It should be noted that the inventive system is not limited to performing only the aforesaid panning and selecting operations. Other appropriate functions and manipulations can be performed based on the user's gestures detected using the projector light and the camera and/or projector light manipulations.

To facilitate the camera tracking of the projector light associated with the user's mobile device, an embodiment of the inventive technique uses manual brightness control on the camera to dim the captured image such that only bright points of light, such as those from the projector, are visible by the camera imager. This yields a high-contrast image in which the detection and tracking of the projector light is straightforward. As would be appreciated by those of skill in the art, the invention is not limited to the use of the camera's manual brightness control in order to generate high contrast image. Other appropriate techniques can be also used, including processing of the image using specialized software installed on the computer connected to the camera and the display.

In an embodiment of the inventive concept, the user's feedback, which can be in a form of gestures and/or changes in the color of the light emitted by the projector or other light source associated with the mobile device, is sensed by the inventive system using the camera 103, which can be a video or still camera, and which detects light emitted by the light source. The light source can be incorporated into or otherwise attached to or associated with the user's mobile device. In one embodiment of the inventive concept, the aforesaid light source is a projector attached to or incorporated into the user's mobile device, such as a cellular phone. On the other hand, the inventive concept is not limited to a projector. Any other light source that can be controlled by the mobile device can be used for this purpose as well.

An embodiment of the inventive system uses the camera 103 to detect the position (within the camera's field of view) and the change in color of the light emitted by the light source. This information is used to determine the gestures performed by the user and detect the change of the color of the light emitted by the light source of the mobile device. The gestures and the color change information is processed by the computer system 101 connected to the display 102 and used to manipulate the information on the display 102.

Figure 2:
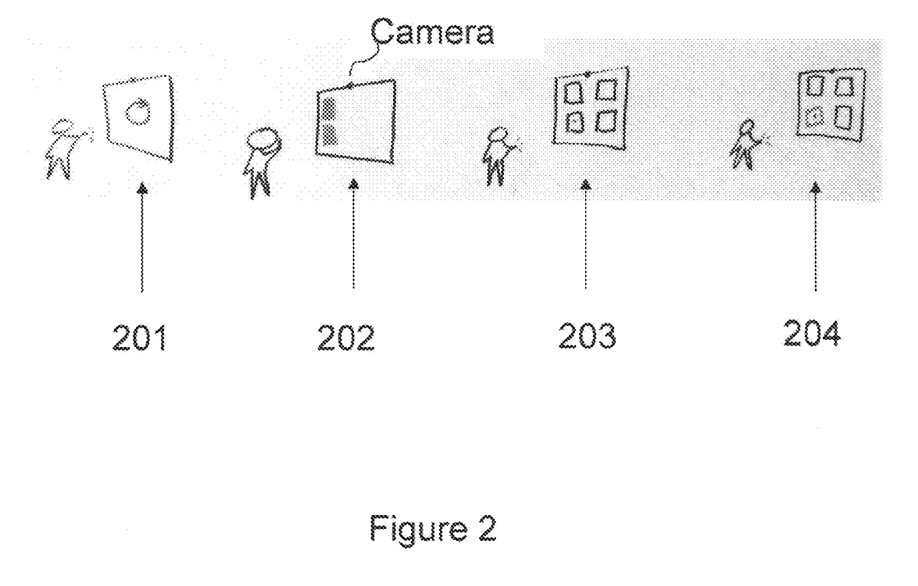
FIG. 2 illustrates an exemplary embodiment of the operation flow according to the inventive concept.

In the single-user case, an embodiment of the inventive approach involves the following method steps, which are illustrated in FIG. 2.

At step 201, a user approaches the public display 102. Using, for example, standard machine vision techniques, the public display 102 recognizes the presence of a nearby user and displays a simple connected, scalable path (such as a circle) and instructs that in order to use the display, the user should turn on user's projector and move it roughly in the same shape as the displayed path. When she does this, the camera recognizes the user's gesture and provides visual feedback that the user is ready to interact with the display. An exemplary gesture is a circle when the mobile device is rotated by the user in a circular fashion. Another example of the possible shape is a figure-8 type shape or any other shape of continuous nature that could be repeated with a hand gesture. The event wherein the user moves the associated handheld light source (projector) roughly in the same shape as the displayed path is determined by detecting the trajectory traced by the light source of the user. After that, the degree of similarity of the detected trajectory and the displayed path may be determined using any method, known in the art. For example, the distance between the trajectory and the displayed path may be calculated and the degree of similarity may be in turn calculated based on the aforesaid distance. After that, the calculated degree of similarity may be compared with a predetermined threshold. If the degree of similarity exceeds the threshold, the determination is made that the trajectory of the light source is similar to the displayed path and that the user is ready to interact with the display.

After that, at step 202, the public display displays two rectangles filled with colors that are easy to distinguish from one another. For example, the display could show red and blue rectangles.

After that, at step 203, the user can either take a picture of the rectangles or she can use an application already installed on her mobile device to generate the rectangles rapidly (for example, she could use mobile PowerPoint to draw two rectangles, each on its own slide, and fill them with the color shown).

After that, at step 204, the user displays one of the two images or slides on her projector. The camera can now both sense the location of the point of light within its field of view as well as the color.

As the user moves the projector, the information on the location of the projector light is processed and the public display 102 updates the location of a cursor on-screen in accordance with the processed location information.

Figure 3:
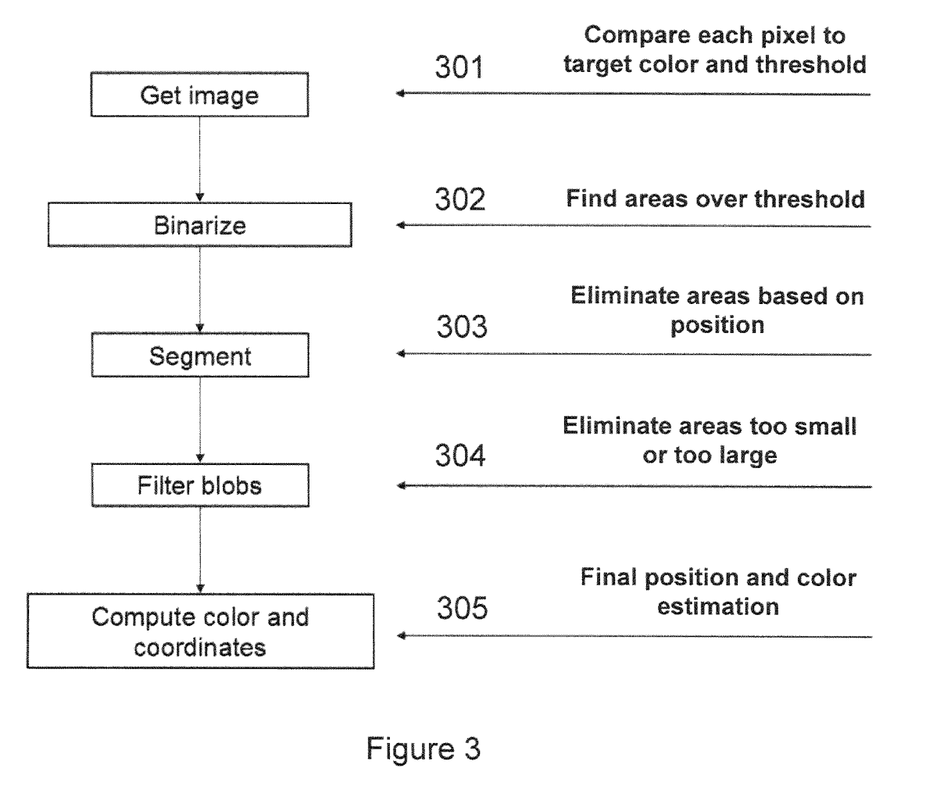
FIG. 3 illustrates an exemplary embodiment of the steps involved in detecting the position of the spot corresponding to the handheld projector.

FIG. 3 illustrates an exemplary sequence of the steps involved in the above process. Specifically, FIG. 3 illustrates an exemplary sequence of steps involved in detecting the position of the spot corresponding to the handheld projector.

Specifically, at step 301, the image of the light source is generated. To this end, each pixel of the image acquired by the camera 103 is compared to the target color (the color of one of the rectangles previously displayed to the user at step 202) and predetermined brightness threshold. At step 302, the aforesaid image is being binarized. To achieve this, the areas on the image that have brightness exceeding the aforementioned threshold are identified and marked.

At step 303, the image is segmented by eliminating areas based on the position.

At step 304, the blobs on the image are filtered by eliminating areas that are too small or too large to be the image of the user's light source.

At step 305, the final estimation of the position and color of the light source is performed in the remaining (not eliminated in steps 303-304) areas of the image.

Figure 4:
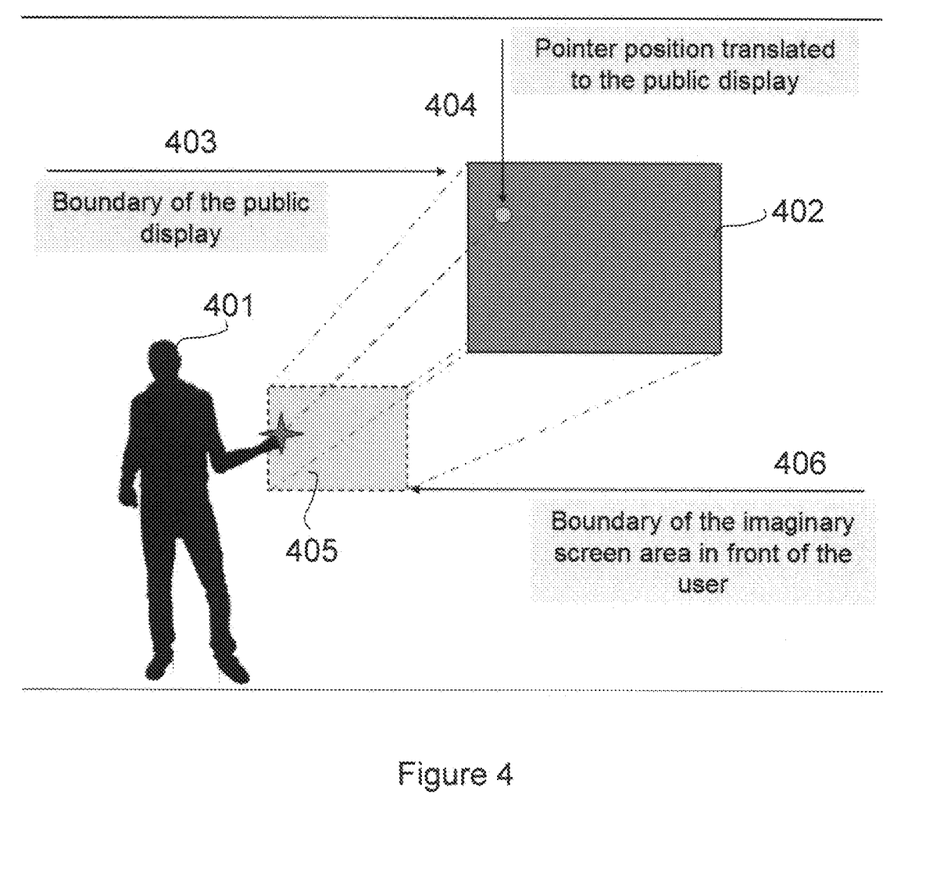
FIG. 4 illustrates how the detected position of the projector in the camera view is transformed into the coordinate space of the public display by, for instance, mapping from points an imaginary screen in front of the user to points in the public display.

Subsequently, the detected position of the projector within the camera view is transformed into the coordinate space of the public display 102 by, for instance, mapping from points an imaginary screen in front of the user to points in the public display 102, as depicted in FIG. 4. Specifically, FIG. 4 illustrates mapping the physical position 405 of the projector within of an imaginary screen area 406 in front of the user 401 to the coordinates 404 on the public display 402 having boundary 403. In one embodiment, the mapping may directly use the detected positions in the coordinate space of the camera image and ignore perspective effects. In another embodiment, the mapping may attempt to compensate for perspective effects and produce a more faithful mapping of the actual physical position of the projector.

In an embodiment of the invention, when the user changes the light emitted by the light source to another color, either by pressing one button to move through her image gallery on the mobile phone or by pressing one button to move to the next slide in the presentation application (such as PowerPoint) displayed by the projector of the mobile phone, the camera 103 recognizes the aforesaid change and transmits the information on the detected change to the interactor currently beneath the current cursor as if it were a click.

Rather than relying directly on detecting the color of the light emitted by the projector, an embodiment of the inventive system may instead detect the change in color of the tracked point to trigger the aforesaid click action. That is, the click action is triggered by detection of the light source color change.

In this manner, the user can select any set of functions on the display. For example, the user could login using a soft keyboard (keyboard generated on the display) to access her personal document store. She could then select the document she is interested in and print it, send it to her device via email or BlueTooth, or perform any other action.

In a multi-use scenario, users are generally expected to stand in mutually non-obscuring positions in the camera view (not in front of one another). The active work area or effective virtual screen in front of each user is expected to be nonoverlapping with the effective virtual screens of other users. Because of these two characteristics, multiple users acting at the same time can be accommodated simultaneously with spatial filtering used to distinguish between users. In one embodiment of the invention, at each point in time, a detected projector position is associated with the closest previous projector position to maintain a continuous association of points with users. In addition, the maximum expected excursion of the projector is limited to the area of the virtual workspace in front of the user. Points outside this area can be eliminated from consideration.

If spatial filtering is insufficient to distinguish multiple users, different color pairs may be assigned to different users to help distinguish their actions. For instance, one user may be assigned red and cyan and another green and magenta.

As would be appreciated by those of skill in the art, because the camera 103 directly senses the light from the projector rather than the projected spot; this allows for greater pointing stability because hand movements are not amplified by the distance between the user and the display 102. In addition, the projector-based solution of the present invention includes an avenue for performing 'click' events (through color change). Moreover, the projector-equipped cell phone is a more broadly useful tool and a user is more likely to carry one as a matter of course than a laser pointer.

In addition, the embodiments of the inventive system described herein can be coupled with a local file sending protocol (such as BlueTooth) to allow users to send files back and forth from the display, and to support fine-grained selection and annotation.

Exemplary Computer Platform

Figure 5:
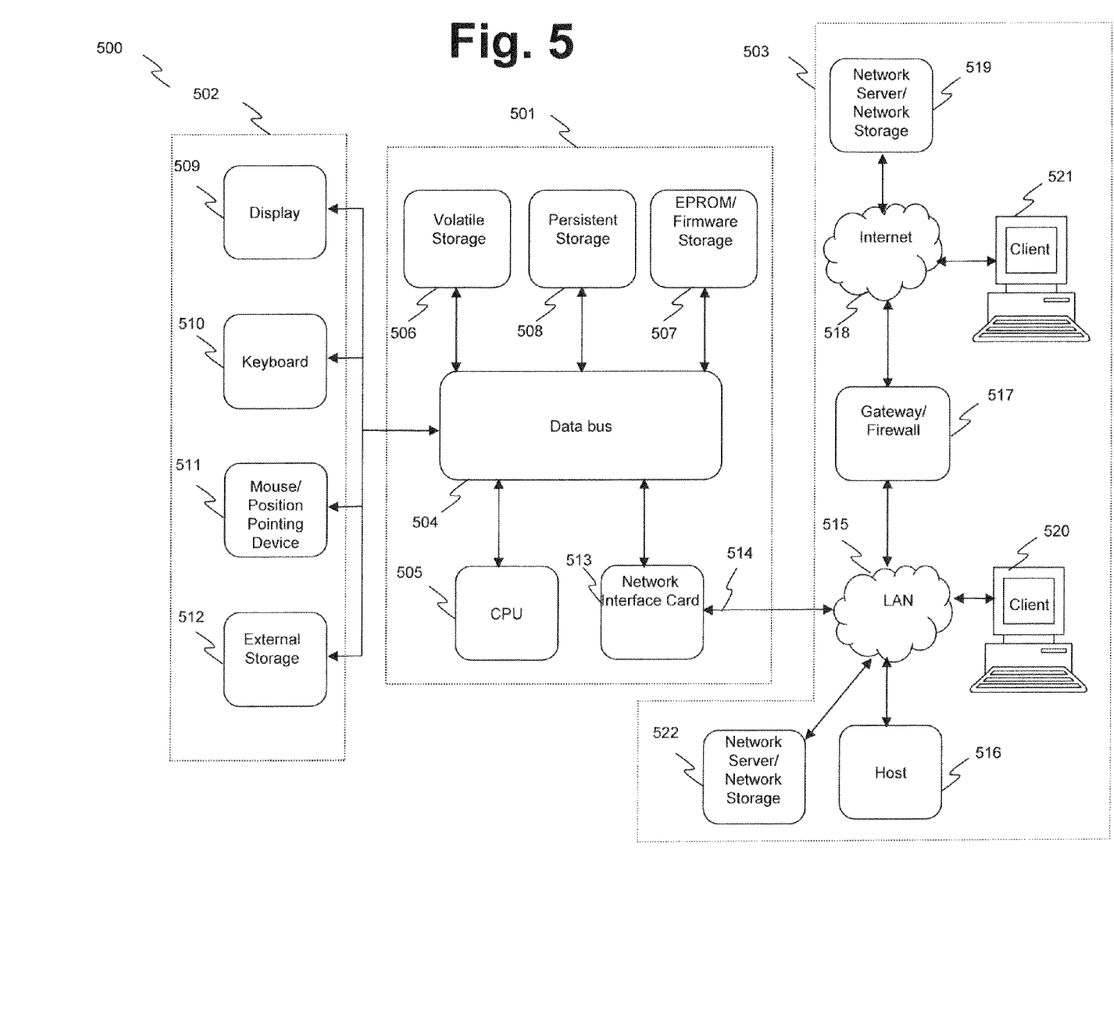
FIG. 5 illustrates an exemplary embodiment of a computer platform upon which the inventive system may be implemented.

FIG. 5 is a block diagram that illustrates an embodiment of a computer/server system 500 upon which an embodiment of the inventive methodology may be implemented. The system 500 includes a computer/server platform 501, peripheral devices 502 and network resources 503.

The computer platform 501 may include a data bus 504 or other communication mechanism for communicating information across and among various parts of the computer platform 501, and a processor 505 coupled with bus 501 for processing information and performing other computational and control tasks. Computer platform 501 also includes a volatile storage 506, such as a random access memory (RAM) or other dynamic storage device, coupled to bus 504 for storing various information as well as instructions to be executed by processor 505. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 501 for storing information and instructions.

Computer platform 501 may be coupled via bus 504 to a display 509, such as a cathode ray tube (CRT), plasma display, or a liquid crystal display (LCD), for displaying information to a system administrator or user of the computer platform 501. An input device 510, including alphanumeric and other keys, is coupled to bus 501 for communicating information and command selections to processor 505. Another type of user input device is cursor control device 511, such as a mouse, a trackball, or cursor direction keys for communicating direction information and command selections to processor 504 and for controlling cursor movement on display 509. This input device typically has two degrees of freedom in two axes, a first axis (e.g., x) and a second axis (e.g., y), that allows the device to specify positions in a plane.

An external storage device 512 may be coupled to the computer platform 501 via bus 504 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 508. Volatile media includes dynamic memory, such as volatile storage 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 514 that is coupled to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 513 typically provides data communication through one or more networks to other network resources. For example, network link 514 may provide a connection through local network 515 to a host computer 516, or a network storage/server 517. Additionally or alternatively, the network link 513 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 514 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 514 and communication interface 513. In the Internet example, when the system 501 acts as a network server, it might transmit a requested code or data for an application program running on client(s) 520 and/or 521 through Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution. In this manner, computer system 501 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized tiered storage systems for enabling panning and selecting of content on large displays using mobile devices. It is intended that the specification and examples be considered as exemplary only, with a true scope and spirit of the invention being indicated by the following claims.

What is claimed is:

1. A system comprising:
a public display configured to simultaneously display information to a plurality of users;
a camera configured to directly sense light produced by at least one handheld light source held in front of the public display by at least one of the plurality of users and to generate image indicative of the sensed light; and
a processing module operatively coupled to the public display and the camera and configured to receive the image indicative of the sensed light from the camera and control the information displayed on the public display based on the received image, wherein the processing module is further configured to cause the public display to display a scalable path and to instruct at least one of the plurality of users to move the at least one handheld light source in a trajectory as the displayed scalable path; wherein the processing module is further configured to identify at least one of the plurality of users who is ready to interact with the public display based on a comparison between the trajectory of the light sensed by the camera and the displayed scalable path and wherein the processing module is further configured to establish an interaction session with the identified at least one of the plurality of users;
wherein the processing module is further configured to filter blobs on the image indicative of the sensed light by eliminating areas that are too small or too large to constitute an image of the handheld light source.

2. A system comprising:
a public display configured to simultaneously display information to a plurality of users;
a camera configured to directly sense light produced by at least one handheld light source held in front of the public display by at least one of the plurality of users and to generate image indicative of the sensed light; and
a processing module operatively coupled to the public display and the camera and configured to receive the image indicative of the sensed light from the camera and control the information displayed on the public display based on the received image, wherein the processing module is further configured to cause the public display to display to the plurality of users a plurality of predetermined colors such that the light produced by at least one handheld light source must be of one of the plurality of the displayed colors in order to interact with the public display;
wherein the camera and the processing module are further collectively configured to:
compare each pixel of the image indicative of the sensed light to a target color of the plurality of colors and a predetermined brightness threshold; and
identify areas on the image indicative of the sensed light that have brightness exceeding the predetermined threshold.

3. The system of claim 2, wherein the processing module and the camera are configured to detect the one of the plurality of the displayed colors and to control the information displayed on the public display based on the detected one of the plurality of the displayed colors.

4. The system of claim 2, wherein the handheld light source is a projector associated with a mobile device held by the user.

5. The system of claim 4, wherein the mobile device is a mobile phone and wherein the projector is embedded within the mobile phone.

6. The system of claim 4, wherein the processing module is further configured to cause the public display to instruct the plurality of users to capture images of the displayed plurality of colors and to redisplay the captured images using the at least one projector.

7. The system of claim 2, wherein the processing module and the camera are configured to detect an event when at least one of the plurality of users switches the at least one handheld light source from a first of the plurality of colors to a second of the plurality of colors and, upon detection of the event, to trigger an action on the public display.

8. The system of claim 7, wherein the action is a selection of at least portion of the information displayed by the public display.

9. The system of claim 2, wherein the processing module and the camera are configured to detect an event when a predetermined gesture is performed by one of the plurality of users using the at least one handheld light source and, upon detection of the event, to trigger an action on the public display.

10. The system of claim 9, wherein the action is a selection of at least portion of the information displayed by the public display.

11. The system of claim 9, wherein the action is panning of at least portion of the information displayed by the public display.

12. The system of claim 2, wherein the processing module and the camera are configured to detect a current location of the at least one handheld light source and to transform the detected current location of the at least one handheld projector into a position on the public display.

13. The system of claim 12, wherein upon detection of a selection event, the processing module is operable to select at least a portion of the information displayed on the public display, the selected at least a portion of the information corresponding to the position on the public display.

14. The system of claim 2, wherein a brightness control of the camera is adjusted such that the camera detects only light at least as bright as the light produced by the at least one handheld light source.

15. The system of claim 2, wherein the processing module is further configured to perform segmentation of the image indicative of the sensed light by eliminating areas based on position of the areas.

16. The system of claim 2, wherein the processing module is further configured to filter blobs on the image indicative of the sensed light by eliminating areas that are too small or too large to constitute an image of the handheld light source.

17. The system of claim 2, wherein the processing module is further configured to perform final estimation of a position and a color of the light source in remaining areas of the image indicative of the sensed light.

18. The system of claim 2, wherein the processing module and the camera are further collectively configured to assign to at least two of the plurality of users at least two non-overlapping areas within a field of view of the camera and detect user's gestures within the assigned non-overlapping areas.

19. The system of claim 18, wherein the processing module is further operable to transform a position of the at least one handheld light source within each of the two non-overlapping areas within a field of view of the camera into a position on the entire public display.

20. A method comprising:
using a public display to simultaneously display information to a plurality of users;
directly sensing, using a camera, light produced by at least one handheld light source held in front of the public display by at least one of the plurality of users and generating image indicative of the sensed light;
controlling, using a processor module, the information displayed on the public display based on the received image;
displaying on the public display a scalable path and instructing the plurality of users to move the at least one handheld projector in a trajectory as the displayed scalable path;
identifying at least one of the plurality of users who is ready to interact with the public display based on a comparison between the trajectory of the light sensed by the camera and the displayed scalable path; and
establishing an interaction session with the identified at least one of the plurality of users;
wherein using the processing module comprises filtering blobs on the image indicative of the sensed light by eliminating areas that are too small or too large to constitute an image of the handheld light source.

21. A method comprising:
using a public display to simultaneously display information to a plurality of users;
directly sensing, using a camera, light produced by at least one handheld light source held in front of the public display by at least one of the plurality of users and generating image indicative of the sensed light;
controlling, using a processor module, the information displayed on the public display based on the received image; and
displaying to the plurality of users a plurality of predetermined colors such that the light produced by at least one handheld light source must be of one of the plurality of the displayed colors in order to interact with the public display;
wherein the using the processing module comprises:
comparing each pixel of the image indicative of the sensed light to a target color of the plurality of colors and a predetermined brightness threshold; and
identifying areas on the image indicative of the sensed light that have brightness exceeding the predetermined threshold.

22. A non-transitory computer readable medium embodying a set of instructions, which, when executed by one or more processors cause the one or more processors to perform a method comprising:
using a public display to simultaneously display information to a plurality of users;
directly sensing, using a camera, light produced by at least one handheld light source held in front of the public display by at least one of the plurality of users and generating image indicative of the sensed light;
controlling, using a processor module, the information displayed on the public display based on the received image;
displaying on the public display a scalable path and instructing the plurality of users to move the at least one handheld projector in the same trajectory as the displayed scalable path;

identifying at least one of the plurality of users who is ready to interact with the public display based on a comparison between the trajectory of the light sensed by the camera and the displayed scalable path; and establishing an interaction session with the identified at least one of the plurality of users;

wherein using the processor module comprises filtering blobs on the image indicative of the sensed light by eliminating areas that are too small or too large to constitute an image of the handheld light source.

23. A non-transitory computer readable medium embodying a set of instructions, which, when executed by one or more processors cause the one or more processors to perform a method comprising:

using a public display to simultaneously display information to a plurality of users;

directly sensing, using a camera, light produced by at least one handheld light source held in front of the public display by at least one of the plurality of users and generating image indicative of the sensed light;

controlling, using a processor module, the information displayed on the public display based on the received image; and displaying to the plurality of users a plurality of predetermined colors such that the light produced by at least one handheld light source must be of one of the plurality of the displayed colors in order to interact with the public display;

wherein the using the processing module comprises:
comparing each pixel of the image indicative of the sensed light to a target color of the plurality of colors and a predetermined brightness threshold; and identifying areas on the image indicative of the sensed light that have brightness exceeding the predetermined threshold.

24. The non-transitory computer readable medium of claim 23, wherein the method further comprises instructing the plurality of users to capture images of the displayed plurality of colors and to redisplay the captured images using the at least one projector.

25. The non-transitory computer readable medium of claim 23, wherein the method further comprises detecting an event when at least one of the plurality of users switches the at least one handheld light source from a first of the plurality of colors to a second of the plurality of colors and, upon detection of the event, triggering an action on the public display.

26. The non-transitory computer readable medium of claim 25, wherein the action is a selection of at least portion of the information displayed by the public display.

27. The non-transitory computer readable medium of claim 23, wherein the method further comprises detecting an event when a predetermined gesture is performed by one of the plurality of users using the at least one handheld light source and, upon detection of the event, triggering an action on the public display.

28. The non-transitory computer readable medium of claim 27, wherein the action is a selection of at least portion of the information displayed by the public display.

29. The non-transitory computer readable medium of claim 27, wherein the action is panning of at least portion of the information displayed by the public display.

* * * * *